United States Patent
Honda et al.

(10) Patent No.: US 12,315,372 B2
(45) Date of Patent: May 27, 2025

(54) PARKING POSITION ADJUSTMENT DEVICE AND PARKING POSITION ADJUSTMENT METHOD

(71) Applicant: TOYOTA JIDOSHA KABUSHIKI KAISHA, Toyota (JP)

(72) Inventors: Daisaku Honda, Nagoya (JP); Hiroya Matsubayashi, Nisshin (JP); Ryota Tomizawa, Mishima (JP); Satoshi Tanabe, Susono (JP); Nobutsugu Maruiwa, Mishima (JP); Yasuhiro Kobatake, Nagoya (JP); Hiroki Awano, Susono (JP); Satoshi Omi, Ebina (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 208 days.

(21) Appl. No.: 18/090,956

(22) Filed: Dec. 29, 2022

(65) Prior Publication Data
US 2023/0326341 A1    Oct. 12, 2023

(30) Foreign Application Priority Data
Mar. 25, 2022 (JP) .................... 2022-050421

(51) Int. Cl.
*G08G 1/14* (2006.01)
*B60W 30/06* (2006.01)
*B60W 60/00* (2020.01)

(52) U.S. Cl.
CPC ............. *G08G 1/143* (2013.01); *B60W 30/06* (2013.01); *B60W 60/001* (2020.02)

(58) Field of Classification Search
CPC . B60W 30/06; B60W 60/001; B62D 15/0285; G06Q 10/08; G06Q 50/40; G08G 1/143; G08G 1/146
See application file for complete search history.

(56) References Cited

U.S. PATENT DOCUMENTS

| | | | |
|---|---|---|---|
| 10,783,599 B1 * | 9/2020 | Hartman | G07C 9/00571 |
| 10,832,574 B1 * | 11/2020 | Agarwal | G08G 1/144 |
| 2015/0057870 A1 * | 2/2015 | Lee | B60W 30/06 701/23 |
| 2017/0253236 A1 * | 9/2017 | Hayakawa | G08G 1/143 |
| 2017/0341640 A1 * | 11/2017 | Liu | B60W 30/06 |
| 2018/0162384 A1 * | 6/2018 | Kim | B60W 30/06 |
| 2018/0196431 A1 * | 7/2018 | Goldberg | G08G 1/147 |

(Continued)

FOREIGN PATENT DOCUMENTS

| | | | | |
|---|---|---|---|---|
| CN | 107957724 A | * | 4/2018 | ............ B60W 10/04 |
| CN | 113401220 A | * | 9/2021 | ......... B62D 15/0285 |

(Continued)

*Primary Examiner* — Babar Sarwar
(74) *Attorney, Agent, or Firm* — Sughrue Mion, PLLC

(57) ABSTRACT

A control unit of a server is a device that adjusts a parking position of a vehicle in a parking lot, and includes an acquisition unit that acquires the parking position of the vehicle scheduled to receive a package in the parking lot, and an adjustment information generation unit that generates adjustment information for adjusting parking of another vehicle in a parking slot adjacent to the parking position of the vehicle scheduled to receive the package in the parking lot such that a space is secured around the vehicle scheduled to receive the package.

14 Claims, 11 Drawing Sheets

(56) References Cited

U.S. PATENT DOCUMENTS

| | | | |
|---|---|---|---|
| 2019/0011926 A1* | 1/2019 | Konishi | G01C 21/3476 |
| 2019/0041864 A1* | 2/2019 | Konishi | G06Q 10/0832 |
| 2020/0079360 A1* | 3/2020 | Tsujino | B60W 50/14 |
| 2020/0086851 A1* | 3/2020 | Krekel | B62D 1/00 |
| 2020/0086852 A1* | 3/2020 | Krekel | B60W 50/14 |
| 2020/0101967 A1* | 4/2020 | Seki | G05D 1/0246 |
| 2020/0143324 A1* | 5/2020 | Takebayashi | G07C 9/00896 |
| 2020/0307559 A1* | 10/2020 | Göricke | B60W 10/20 |
| 2020/0311641 A1* | 10/2020 | Noguchi | G06V 20/586 |
| 2020/0361462 A1* | 11/2020 | Noguchi | G08G 1/22 |
| 2020/0384983 A1* | 12/2020 | Noguchi | G06V 20/586 |
| 2021/0046976 A1* | 2/2021 | Ziebart | G08G 1/168 |
| 2021/0101586 A1* | 4/2021 | Woo | B62D 15/0285 |
| 2021/0294592 A1* | 9/2021 | Noguchi | G06Q 10/02 |
| 2021/0316718 A1* | 10/2021 | Sugano | G06Q 10/20 |
| 2022/0017120 A1* | 1/2022 | Gerrese | G05D 1/0088 |
| 2022/0176945 A1* | 6/2022 | Takato | G08G 1/143 |
| 2022/0221867 A1* | 7/2022 | Taveira | G05D 1/617 |
| 2022/0253059 A1* | 8/2022 | Pandey | G05D 1/0274 |
| 2022/0306090 A1* | 9/2022 | Noguchi | B60W 30/181 |
| 2022/0366369 A1* | 11/2022 | Nice | G06Q 10/08355 |
| 2023/0109611 A1* | 4/2023 | Noh | G06Q 30/0601 705/26.1 |
| 2023/0141416 A1* | 5/2023 | Kulkarni | H04W 4/44 701/423 |
| 2023/0166725 A1* | 6/2023 | Tsimhoni | G06F 3/0482 701/25 |
| 2023/0206763 A1* | 6/2023 | Beaurepaire | G08G 1/0145 340/932.2 |
| 2023/0230135 A1* | 7/2023 | Yamaura | G08G 1/14 701/24 |
| 2023/0278593 A1* | 9/2023 | Wang | B60W 30/06 701/26 |
| 2023/0306846 A1* | 9/2023 | Sasatani | G08G 1/141 |

FOREIGN PATENT DOCUMENTS

| | | | | |
|---|---|---|---|---|
| CN | 115959118 A | * | 4/2023 | |
| CN | 111861301 B | * | 4/2024 | B60W 30/06 |
| DE | 102015218350 A1 | * | 3/2017 | |
| DE | 102018213904 B3 | * | 1/2020 | |
| DE | 102019126741 A1 | * | 4/2020 | B60W 30/06 |
| DE | 102021207444 A1 | * | 1/2023 | |
| EP | 4052997 A1 | * | 9/2022 | B60W 30/06 |
| EP | 3655937 B1 | * | 8/2024 | B60W 30/06 |
| JP | 2018195158 A | * | 12/2018 | |
| JP | 6632631 B2 | * | 1/2020 | B62D 15/0285 |
| JP | 2020-52942 A | | 4/2020 | |
| JP | 2020-070188 A | | 5/2020 | |
| WO | WO-2012069247 A1 | * | 5/2012 | B62D 15/0285 |
| WO | WO-2022185052 A1 | * | 9/2022 | G06Q 10/02 |
| WO | WO-2023166845 A1 | * | 9/2023 | B60W 30/06 |

* cited by examiner

PARKING POSITION ADJUSTMENT DEVICE AND PARKING POSITION ADJUSTMENT METHOD

CROSS-REFERENCE TO RELATED APPLICATION

This application claims priority to Japanese Patent Application No. 2022-050421 filed on Mar. 25, 2022, incorporated herein by reference in its entirety.

BACKGROUND

1. Technical Field

The present disclosure relates to a parking position adjustment device and a parking position adjustment method.

2. Description of Related Art

Conventionally, it is known that when delivery schedule information in which a package is delivered to a parked vehicle is received, and it is determined that a door of a cargo loading unit cannot be opened and the vehicle can be moved, a driving unit of the vehicle is started, and the vehicle is moved to a position where the door is opened using an automatic parking function (for example, Japanese Unexamined Patent Application Publication No. 2020-070188 (JP 2020-070188 A)).

SUMMARY

According to a technique described in JP 2020-070188 A, when a package is delivered to a vehicle where the package is scheduled to be delivered and a door of a cargo loading unit cannot be opened, it is necessary to start a driving unit of the vehicle and move the vehicle to a position where the door of the cargo loading unit is opened.

In view of the above issues, an object of the present disclosure is to provide a parking position adjustment device and a parking position adjustment method capable of delivering a package to a vehicle without moving the vehicle scheduled to receive the package in a parking lot.

The gist of the present disclosure is as follows.

(1) A parking position adjustment device for adjusting a parking position of a vehicle in a parking lot, the parking position adjustment device including:
an acquisition unit that acquires the parking position of the vehicle scheduled to receive a package in the parking lot; and
an adjustment information generation unit that generates adjustment information for adjusting parking of another vehicle in a parking slot adjacent to the parking position such that a space is secured around the vehicle scheduled to receive the package.

(2) In the parking position adjustment device described in (1), the adjustment information generation unit generates, based on the parking position of the vehicle scheduled to receive the package and a position of a loading port of the vehicle for the package, the adjustment information for adjusting parking of the other vehicle in a parking slot adjacent to the loading port such that a space is secured around the loading port.

(3) In the parking position adjustment device described in (2), the adjustment information generation unit generates the adjustment information such that a priority of the parking slot adjacent to the loading port of the vehicle scheduled to receive the package is lower than priorities of other parking slots.

(4) In the parking position adjustment device described in (3), when another parking slot other than the parking slot adjacent to the loading port is empty, the adjustment information generation unit generates the adjustment information in which the other parking slot other than the parking slot adjacent to the loading port is set as a parking position of the other vehicle.

(5) In the parking position adjustment device described in (3), when another parking slot other than the parking slot adjacent to the loading port is not empty, the adjustment information generation unit generates the adjustment information in which the parking slot adjacent to the loading port is set as a parking position of the other vehicle and the other vehicle is separated from the loading port.

(6) In the parking position adjustment device described in any one of (1) to (5), the adjustment information is display information for adjusting a parking position of the other vehicle; and
the parking position adjustment device includes a transmission unit that transmits the display information to the other vehicle so as to display the display information on a display device provided in the other vehicle.

(7) In the parking position adjustment device described in any one of (1) to (5), the adjustment information is sound information for adjusting a parking position of the other vehicle; and
the parking position adjustment device includes a transmission unit that transmits the sound information to the other vehicle so as to output the sound information as sound from a sound output device provided in the other vehicle.

(8) In the parking position adjustment device described in any one of (1) to (5), the adjustment information is control information for controlling a parking position of the other vehicle;
the other vehicle is an autonomous driving vehicle that is able to drive autonomously; and
the parking position adjustment device includes a transmission unit that transmits the control information to the other vehicle so as to control the parking position of the other vehicle based on the control information.

(9) In the parking position adjustment device described in any one of (1) to (5), the adjustment information is control information for controlling a parking position of the other vehicle:
the other vehicle is transported to the parking position by a parking robot; and
the parking position adjustment device includes a transmission unit that transmits the control information to the parking robot so as to control the parking position of the other vehicle based on the control information.

(10) A parking position adjustment method for adjusting a parking position of a vehicle in a parking lot, the parking position adjustment method comprising:
a step of acquiring the parking position of the vehicle scheduled to receive a package in the parking lot; and
a step of generating adjustment information for adjusting parking of another vehicle in a parking slot adjacent to the parking position such that a space is secured around the vehicle scheduled to receive the package.

(11) In the parking position adjustment method described in (10), in the step of generating the adjustment information, based on the parking position of the vehicle scheduled to receive the package and a position of a loading port of the vehicle for the package, the adjustment information for adjusting parking of the other vehicle in a parking slot adjacent to the loading port is generated.

(12) In the parking position adjustment method described in (11), in the step of generating the adjustment information, the adjustment information is generated such that a priority of the parking slot adjacent to the loading port of the vehicle scheduled to receive the package is lower than priorities of other parking slots.

(13) In the parking position adjustment method described in (12), in the step of generating the adjustment information, when another parking slot other than the parking slot adjacent to the loading port is empty, the adjustment information in which the other parking slot other than the parking slot adjacent to the loading port is set as a parking position of the other vehicle is generated.

(14) In the parking position adjustment method described in (12), in the step of generating the adjustment information, when another parking slot other than the parking slot adjacent to the loading port is not empty, the adjustment information in which the parking slot adjacent to the loading port is set as a parking position of the other vehicle and the other vehicle is separated from the loading port is generated.

(15) In the parking position adjustment method described in any one of (10) to (14), the adjustment information is display information for adjusting a parking position of the other vehicle; and
  the parking position adjustment method includes a step of transmitting the display information to the other vehicle so as to display the display information on a display device provided in the other vehicle.

(16) In the parking position adjustment method described in any one of (10) to (14), the adjustment information is sound information for adjusting a parking position of the other vehicle; and
  the parking position adjustment method includes a step pf transmitting the sound information to the other vehicle so as to output the sound information as sound from a sound output device provided in the other vehicle.

(17) In the parking position adjustment method described in any one of (10) to (14), the adjustment information is control information for controlling a parking position of the other vehicle:
  the other vehicle is an autonomous driving vehicle that is able to drive autonomously; and
  the parking position adjustment method includes a step of transmitting the control information to the other vehicle so as to control the parking position of the other vehicle based on the control information.

(18) In the parking position adjustment method described in any one of (10) to (14), the adjustment information is control information for controlling a parking position of the other vehicle:
  the other vehicle is transported to the parking position by a parking robot; and
  the parking position adjustment method includes a step of transmitting the control information to the parking robot so as to control the parking position of the other vehicle based on the control information.

According to the present disclosure, the parking position adjustment device and the parking position adjustment method capable of delivering the package to the vehicle scheduled to receive the package in the parking lot without moving the vehicle are provided.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, several embodiments according to the present disclosure will be described with reference to the drawings. However, these descriptions are intended merely to illustrate preferred embodiments of the present disclosure and are not intended to limit the present disclosure to such particular embodiments. In the following description, similar components are given the same reference numbers.

1. First Embodiment

Figure 1:
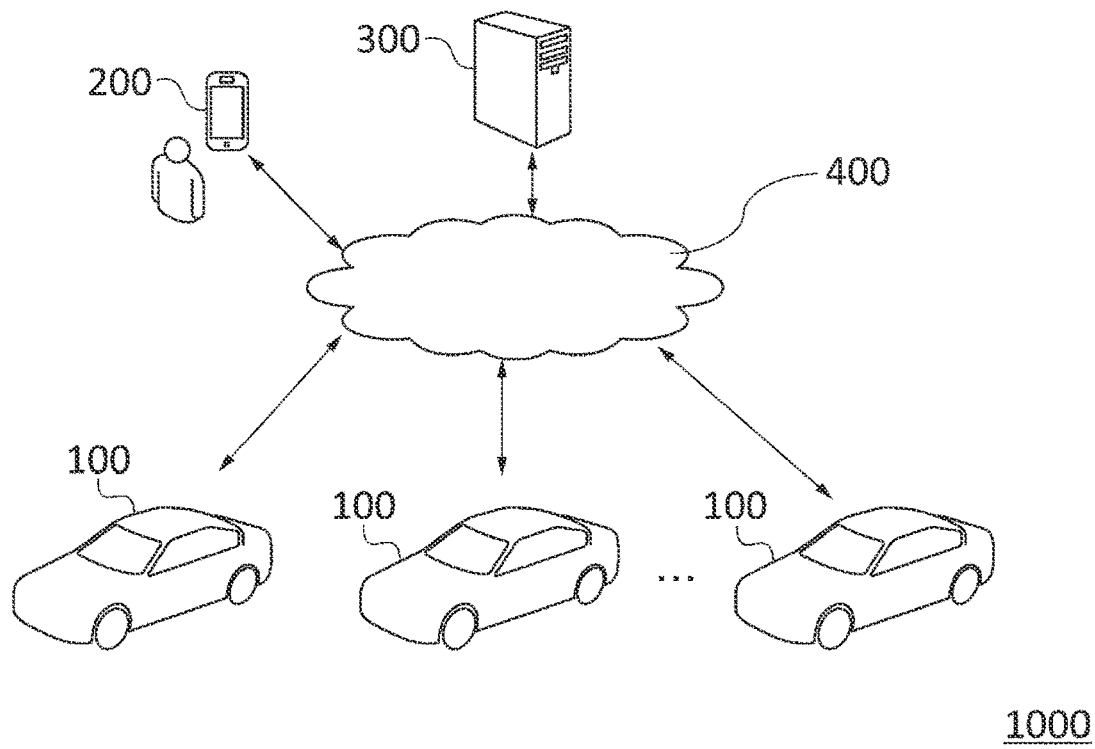
FIG. 1 is a schematic diagram showing a configuration of a delivery management system used by a parked vehicle to receive a package.

FIG. 1 is a schematic diagram showing a configuration of a delivery management system 1000 used by a parked vehicle to receive a package. This delivery management system 1000 is configured to include a plurality of vehicles 100, a terminal 200, and a delivery company server 300. The vehicles 100, the terminal 200, and the server 300 are connected to be able to communicate with each other via a communication network 400 such as the Internet. The vehicles 100, the terminal 200, and the server 300 may be connected via wireless communication such as WiFi, a wireless network of a mobile phone network such as long term evolution (LTE), LTE-Advance, fourth generation (4G), and fifth generation (5G), a dedicated network such as virtual private network (VPN), and a network such as local area network (LAN).

The vehicle 100 is a manual driving vehicle that a driver manually drives, or an autonomous driving vehicle that can travel autonomously, etc., and more specifically, is an automobile such as an engine vehicle driven by an engine, a plug-in hybrid electric vehicle (PHEV), and a battery electric vehicle (BEV). In a first embodiment, a case where the vehicles 100, 102, 104 are manual driving vehicles is shown. The vehicle 100 can be used to receive a package while the vehicle 100 is parked. When the package is delivered to the parked vehicle 100, a delivery instruction is transmitted from the terminal 200 to the delivery company server 300. The terminal 200 may be a terminal such as a smartphone owned by a user (owner) of the vehicle 100, or a terminal provided in a delivery reception desk (for example, a store, a home delivery reception desk, etc.) that accepts delivery of the package. The delivery instruction includes information that specifies the package (for example, information on a tag attached to the package), position information of the vehicle 100 in a parking lot (number of a parking slot where the vehicle 100 is parked), the number of the vehicle 100, the position of a loading port for loading the package into the vehicle 100, desired delivery date and time, the size of the package, etc.

The delivery company server 300 that has received the delivery instruction causes a delivery person to deliver the package. Thus, the server 300 transmits the delivery instruction to a terminal owned by the delivery person (not shown in FIG. 1). When the terminal of the delivery person receives the delivery instruction, the delivery person delivers the package to the vehicle 100 according to the delivery instruction. Further, the server 300 may cause a delivery robot (not shown in FIG. 1) to deliver the package. In this case, the delivery instruction is transmitted from the server 300 to the delivery robot. When the delivery instruction is received, the delivery robot delivers the package to the vehicle 100 according to the delivery instruction.

As described above, since the package is delivered to the parked vehicle 100, the user does not need to receive the package at home, so that the degree of freedom of a place where the user receives the package is increased. Further, for example, when the user parks the vehicle 100 in the parking lot and goes shopping nearby, the purchased product is delivered to the vehicle 100, so that there is no need for the user to carry the product to the vehicle 100 by himself/herself, which increases convenience for the user.

By the way, when the delivery person or the delivery robot delivers the package to the parked vehicle 100, hindrance may occur in loading the package into the vehicle 100 if another vehicle is parked close to the loading port of the vehicle 100 for the package.

Figure 2:
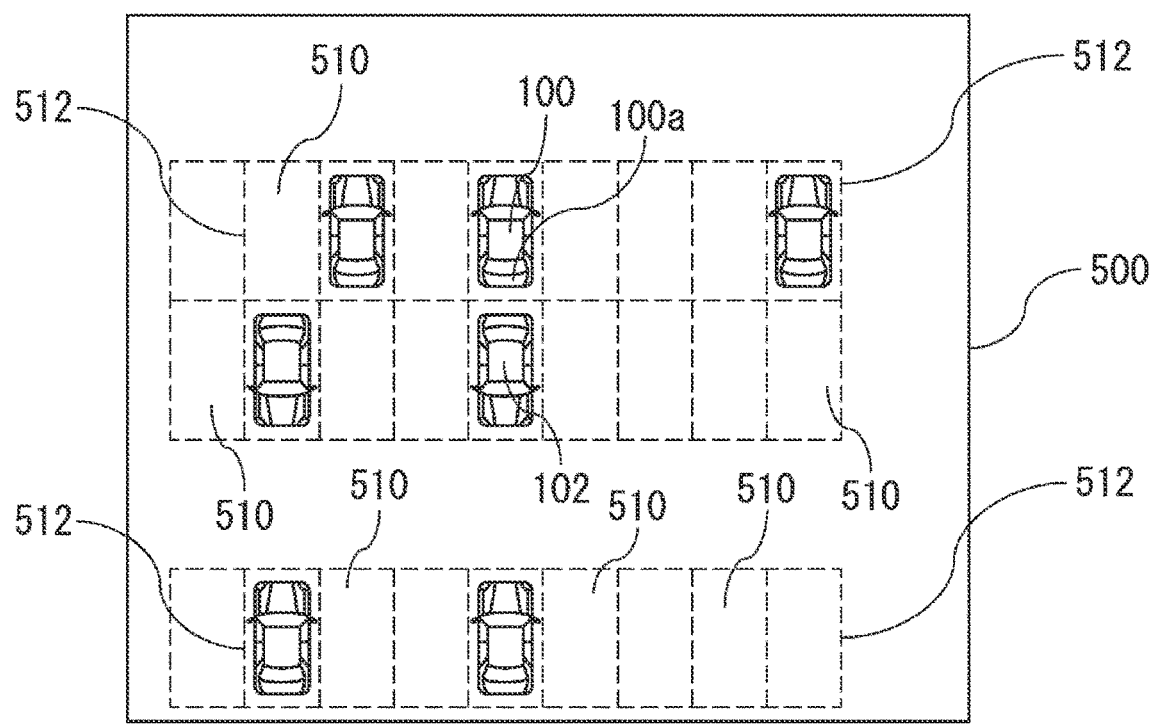
FIG. 2 is a plan view showing a parking lot, and is a diagram showing an example where hindrance occurs when the package is loaded into the vehicle.
Figure 3:
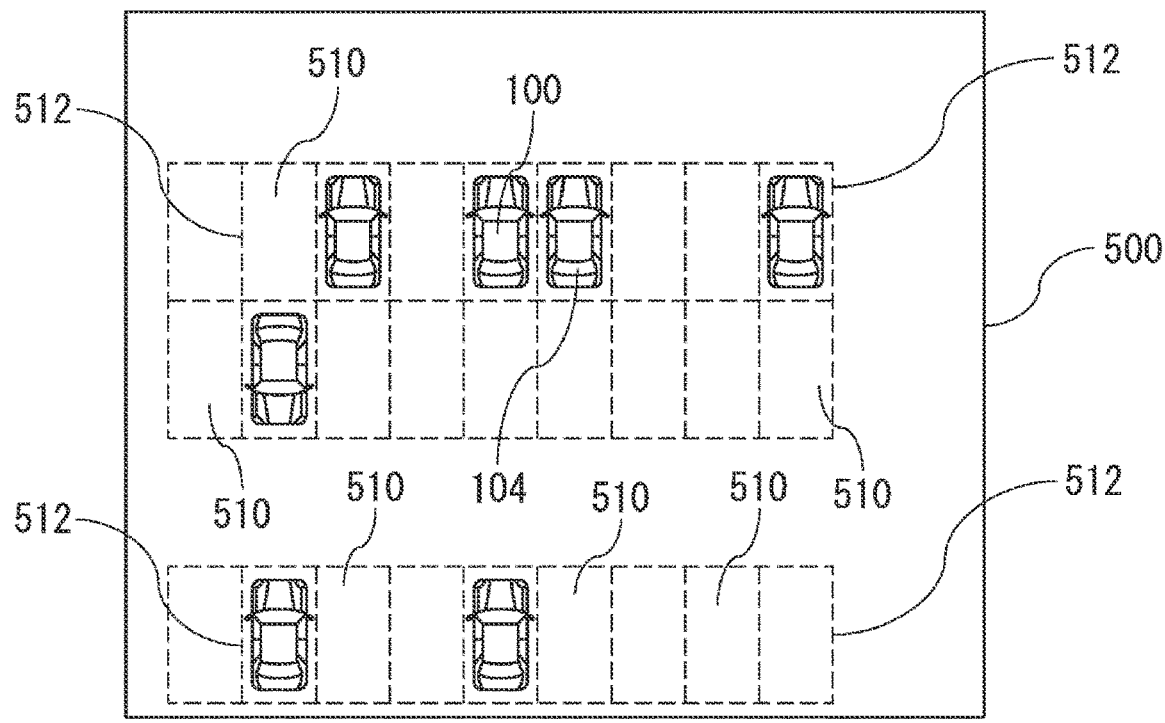
FIG. 3 is a plan view showing the parking lot, and is a diagram showing an example where hindrance occurs when the package is loaded into the vehicle.

FIGS. 2 and 3 are each a plan view showing a parking lot 500, and are each a diagram showing an example where hindrance occurs when the package is loaded into the vehicle 100. The parking lot 500 is provided with a plurality of parking slots 510 where the vehicles 100 are parked. The parking slots 510 are partitioned by marking lines 512. In the example shown in FIG. 2, the vehicle 100 includes a trunk 100a capable of loading the package at a rear side thereof. As shown in FIG. 2, when another vehicle 102 is parked closely to the trunk 100a at the rear side of the vehicle 100, and the package is loaded into the trunk 100a, a space required for loading the package cannot be secured, so that hindrance occurs when the package is loaded. For example, when the other vehicle 102 is parked closely to the trunk 100a at the rear side of the vehicle 100, the trunk 100a may not be opened or closed. Further, when the other vehicle 102 is parked closely to the trunk 100a at the rear side of the vehicle 100, the delivery person carrying the package or the delivery robot carrying the package may not be able to enter a space between the trunk 100a and the vehicle 102.

The loading port for loading the package into the vehicle 100 may be not only the trunk 100a at the rear side of the vehicle 100, but also right and left doors of the vehicle 100. For example, when there is no space for loading the package into the trunk 100a, or the vehicle 100 is not provided with the trunk 100a, in the delivery instruction, the right door or the left door is instructed as a loading port for loading the package. In the example shown in FIG. 3, another vehicle 104 is parked closely to the right side of the vehicle 100. In this case, when the package is to be loaded into a rear seat on the right side of the vehicle 100, a space required for loading the package cannot be secured, so that hindrance occurs when the package is loaded. For example, when the other vehicle 104 is parked closely to the right side of the vehicle 100, the right door may not be opened or closed. Further, when the other vehicle 104 is parked closely to the right side of the vehicle 100, the delivery person carrying the package or the delivery robot carrying the package may not be able to enter a space between the right side of the vehicle 100 and the other vehicle 104.

Figure 4:
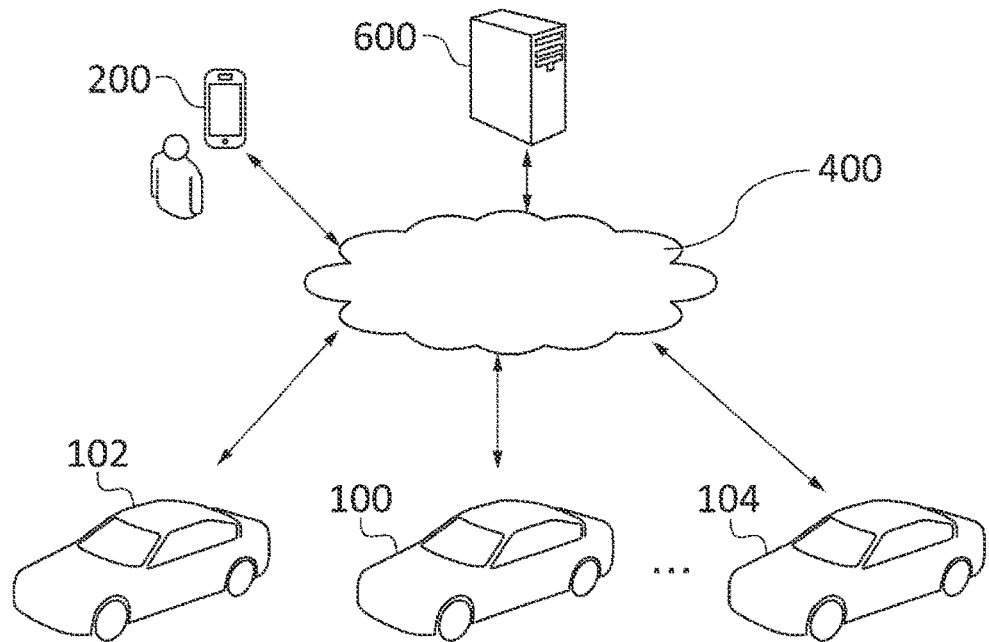
FIG. 4 is a schematic diagram showing a configuration of a parking management system according to the present embodiment.

Therefore, a parking management system 2000 according to the present embodiment adjusts parking of the other vehicle when the vehicle 100 scheduled to receive the package is parked in the parking lot. FIG. 4 is a schematic diagram showing a configuration of the parking management system 2000 according to the present embodiment. This parking management system 2000 is configured to include the vehicles 100, 102, 104, the terminal 200 described above, and a server 600 that manages the parking position of the vehicle in the parking lot. The vehicle 100 is a vehicle scheduled to receive the package, and the vehicles 102, 104 are other vehicles that intend to be parked in the parking lot when the vehicle 100 scheduled to receive the package is parked in the parking lot. The vehicles 100, 102, 104, the terminal 200, and the server 600 are connected to be able to communicate with each other via the communication network 400 such as the Internet, similarly to the delivery management system 1000 shown in FIG. 1.

Figure 5:
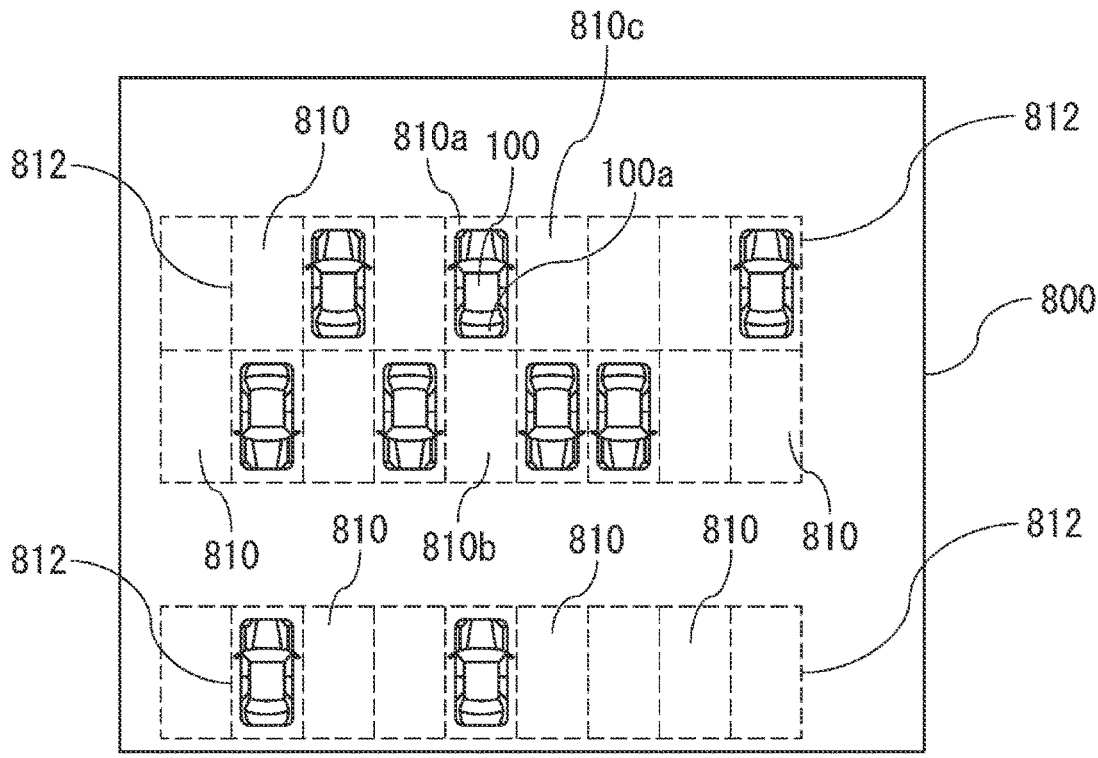
FIG. 5 is a plan view showing a parking lot where a parking position of a vehicle is adjusted by the parking management system according to the present embodiment.

FIG. 5 is a plan view showing a parking lot 800 where the parking position of the vehicle is adjusted by the parking management system 2000 according to the present embodiment. The parking lot 800 is provided with a plurality of parking slots 810 where the vehicles 100, 102, 104 are parked. The parking slots 810 are partitioned by marking lines 812, and a number is assigned to each parking slot 810. The parking lot 800 may be equipped with a camera for capturing images of parked vehicles.

In the example shown in FIG. 5, when the package is loaded into the trunk 100a at the rear side of the vehicle 100, the server 600 lowers a priority of the parking slot 810b adjacent to the trunk 100a side with respect to a parking slot 810*a* where the vehicle 100 is parked, so that each of the other vehicles 102, 104 is not parked in a parking slot 810*b* as much as possible. Alternatively, when the server 600 causes each of the other vehicles 102, 104 to be parked in the parking slot 810*b* adjacent to the trunk 100*a* side, the server 600 causes each of the other vehicles 102, 104 to be parked in the parking slot 810*b* in a state where a space required for loading the package is secured between the trunk 100*a* and each of the other vehicles 102, 104.

Similarly, in the example shown in FIG. 5, when the package is loaded into the right side of the rear seat of the vehicle 100, the server 600 lowers a priority of a parking slot 810*c* adjacent to the right side of the parking slot 810*a* where the vehicle 100 is parked, so that each of the other vehicles 102, 104 is not parked in the parking slot 810*c* as much as possible. Alternatively, when the server 600 causes each of the other vehicles 102, 104 to be parked in the parking slot 810*c* adjacent to the right side of the vehicle 100, the server 600 causes each of the other vehicles 102, 104 to be parked in the parking slot 810*c* in a state where a space required for loading the package is secured between the vehicle 100 and each of the other vehicles 102, 104.

As described above, by adjusting the parking of each of the other vehicles 102, 104 in the parking slot adjacent to the parking slot where the vehicle 100 into which the package is loaded is parked, the space required for loading the package into the vehicle 100 is secured, so that occurrence of hindrance when the package is loaded is suppressed. Therefore, when the package is loaded into the vehicle 100, the package can be loaded without moving the vehicle 100 or other vehicles around the vehicle 100 or changing the direction of the vehicle 100. Further, a process when the package is loaded into the vehicle 100 may be performed in the same manner as JP 2020-070188 A described above. The vehicle 100 into which the package is loaded may perform actions such as turning on a headlight or honking a horn such that the delivery person or the delivery robot can recognize the vehicle 100, for example, whereby the vehicle 100 may notify the delivery person or the delivery robot of the position of the own vehicle.

Figure 6:
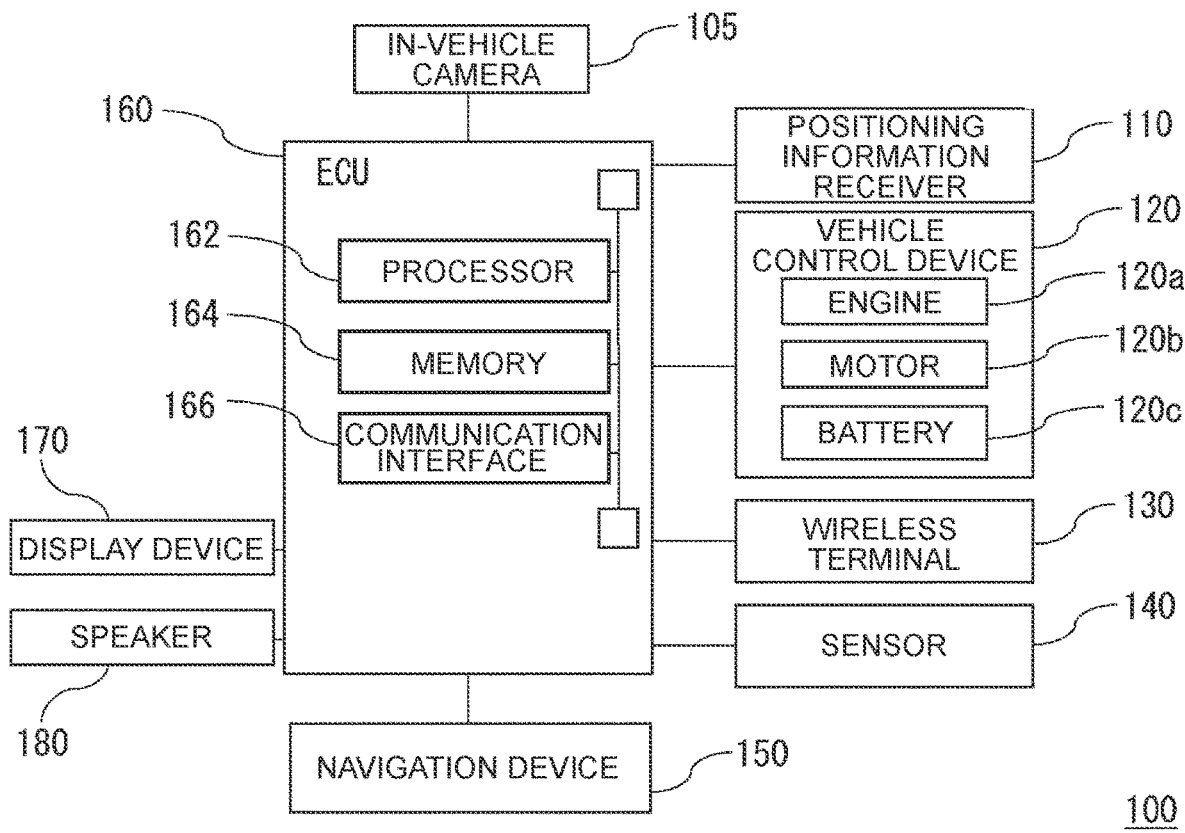
FIG. 6 is a schematic diagram showing a configuration of a vehicle control system mounted on the vehicle in the parking management system according to the present embodiment.

FIG. 6 is a schematic diagram showing a configuration of a vehicle control system mounted on each of the vehicles 100, 102, 104 in the parking management system 2000 according to the present embodiment. The vehicle control system includes an in-vehicle camera 105, a positioning information receiver 110, a vehicle control device 120, a wireless terminal 130, one or more sensors 140, a navigation device 150, and an electronic control unit (ECU: hereinafter referred to as the ECU) 160, a display device 170, and a speaker 180. Each of the in-vehicle camera 105, the positioning information receiver 110, the vehicle control device 120, the wireless terminal 130, the one or more sensors 140, the navigation device 150, the ECU 160, the display device 170, and the speaker 180 is connected to be able to communicate with each other via an in-vehicle network conforming to standards such as a controller area network (CAN) and an Ethernet (registered trademark).

The in-vehicle camera 105 has a two-dimensional detector composed of an array of photoelectric conversion elements having sensitivity to visible light such as a charge coupled device (CCD) or complementary metal-oxide semiconductor (C-MOS), and an imaging optical system that forms an image of a region to be imaged on the two-dimensional detector. The in-vehicle camera 105 is installed on a dashboard inside the vehicle, or near a windshield, side window glass, or rear window glass, etc., captures images around the vehicles 100, 102, 104 (for example, an area forward of the vehicle, an area on the side of the vehicle, or an area rearward of the vehicle) every predetermined imaging cycle (for example, one thirtieth seconds to one tenth seconds), and generates the images around the vehicles 100, 102, 104. The image obtained by the in-vehicle camera 105 is preferably a color image. Further, the in-vehicle camera 105 may be composed of a stereo camera, and may be configured to acquire the distance from each structure in the image, based on the parallax of the right and left images. Every time the images are generated, the in-vehicle camera 105 outputs the generated images to the ECU 160 via the in-vehicle network.

The positioning information receiver 110 acquires positioning information indicating the current positions and the postures of the vehicles 100, 102, 104. For example, the positioning information receiver 110 can be a global positioning system (GPS) receiver. Each time the positioning information receiver 110 receives the positioning information, the positioning information receiver 110 outputs the acquired positioning information to the ECU 160 via the in-vehicle network.

The vehicle control device 120 is one of various devices related to vehicle control, and includes an engine 120*a* and a motor 120*b* as a driving source for causing the vehicles 100, 102, 104 to travel, and a battery 120*c* for storing electric power. Further, the vehicle control device 120 includes a steering device and a braking device. In FIG. 1, a case where the vehicles 100, 102, 104 are PHEVs is shown, and when the vehicles 100, 102, 104 are BEVs, the engine 120*a* is not included in the vehicle control device 120.

The wireless terminal 130 is a communication interface with the communication network 400, and includes, for example, an antenna and a signal processing circuit that executes various processes related to wireless communication such as modulation and demodulation of radio signals. The wireless terminal 130 receives, for example, a downlink radio signal from a radio base station connected to the communication network 400, and transmits an uplink radio signal to the radio base station. The wireless terminal 130 extracts a signal transmitted from the server 600 to the vehicles 100, 102, 104 from the received downlink radio signal and transfers the signal to the ECU 160. Further, the wireless terminal 130 generates the uplink radio signal including a signal received from the ECU 160 and transmitted to the server 600, and transmits the radio signal.

The one or more sensors 140 includes a sensor for monitoring the periphery of the vehicles 100, 102, 104, for example, a sensor such as a light detection and ranging (Lidar) and a radar.

The navigation device 150 obtains a scheduled travel route from the current positions of the vehicles 100, 102, 104 to the moving destinations according to a predetermined route search method such as Dijkstra's algorithm Thus, the navigation device 150 is provided with a memory for storing map information. The map information may be stored in a memory 164 of the ECU 160.

The ECU 160 includes a processor 162, the memory 164, and a communication interface 166. The processor 162 may include one or more central processing units (CPUs) and peripheral circuits thereof. The processor 162 may further include other arithmetic circuits such as a logical operation unit, a numerical operation unit, or a graphic processing unit. The processor 162 provides a function that matches a predetermined purpose by executing a computer program that is expanded to be executable in the work area of the memory 164. The memory 164 has, for example, a volatile semiconductor memory and a non-volatile semiconductor memory. The memory 164 stores various kinds of information. The communication interface 166 has an interface circuit for connecting the ECU 160 to the in-vehicle network.

The display device 170 is composed of, for example, a liquid crystal display (LCD), and is provided near an instrument panel or a dashboard, etc., to display various kinds of information. The speaker 180 outputs various kinds of information by sound.

Figure 7:
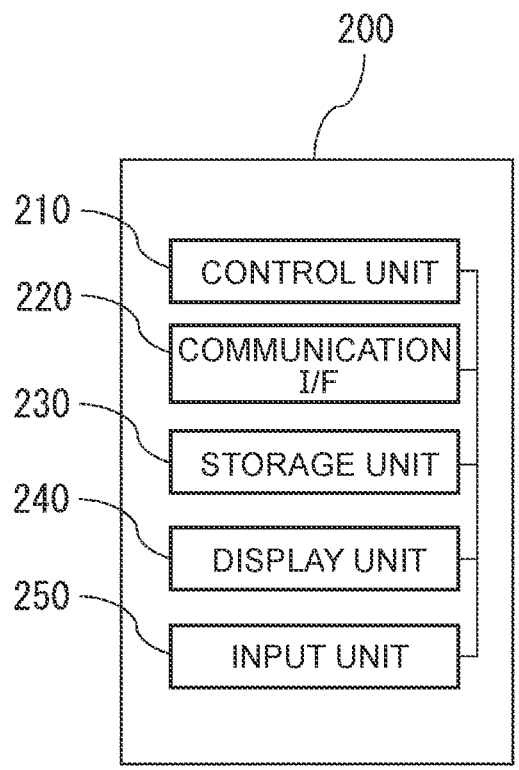
FIG. 7 is a block diagram showing a hardware configuration of a terminal in the parking management system according to the present embodiment.

FIG. 7 is a block diagram showing a hardware configuration of the terminal 200 in the parking management system 2000 according to the present embodiment. The terminal 200 includes a control unit 210, a communication interface (I/F) 220, a storage unit 230, a display unit 240, and an input unit 250. The control unit 210, the communication I/F 220, the storage unit 230, and the display unit 240 of the terminal 200 has the same function as the processor 162, the wireless terminal 130, the memory 164, and the display device 170 of each of the vehicles 100, 102, 104. The input unit 250 is composed, for example, of a touch sensor, a keyboard, etc., and information corresponding to an operation by the user is input to the input unit 250. When the input unit 250 is composed of the touch sensor, the display unit 240 and the input unit 250 may be configured as an integrated touch panel.

Figure 8:
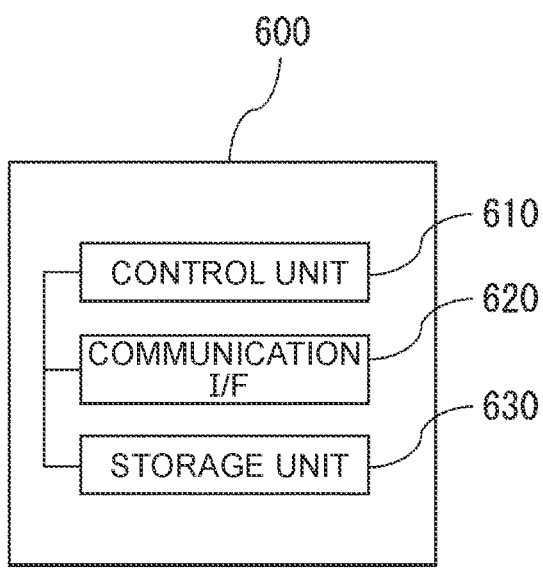
FIG. 8 is a block diagram showing a hardware configuration of a server in the parking management system according to the present embodiment.

FIG. 8 is a block diagram showing a hardware configuration of the server 600 in the parking management system 2000 according to the present embodiment. The server 600 includes a control unit 610 that is one aspect of the parking position adjustment device, a communication I/F 620, and a storage unit 630. The control unit 610 of the server 600 has a function similar to the processor 162 of the ECU 160. The communication I/F 620 of the server 600 includes a communication module connected to the communication network 400. For example, the communication I/F 620 may include a communication module that complies with a wired local area network (LAN) standard. The server 600 is connected to the communication network 400 via the communication I/F 620. The storage unit 630 of the server 600 includes, for example, a volatile semiconductor memory and a non-volatile semiconductor memory. The storage unit 630 stores various kinds of information such as a floor plan of the parking lot 800 and the size of the parking slot 810. In the floor plan of the parking lot 800, the number and the position of the parking slot 810 are associated.

Figure 9:
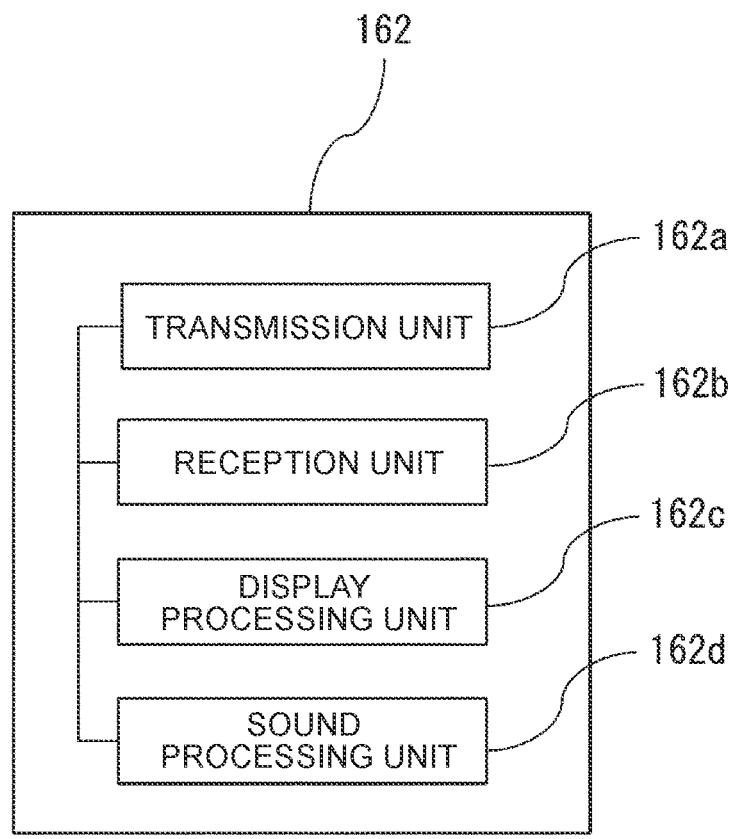
FIG. 9 is a schematic diagram showing a functional block of a processor of an electronic control unit (ECU) provided in each vehicle.

FIG. 9 is a schematic diagram showing a functional block of the processor 162 of the ECU 160 provided in each of the vehicles 100, 102, 104. The processor 162 includes a transmission unit 162a, a reception unit 162b, a display processing unit 162c, and a sound processing unit 162d. Each of these units included in the processor 162 is, for example, a functional module realized by a computer program operating on the processor 162. That is, each of these units included in the processor 162 is composed of the processor 162 and a program (software) for operating the processor 162. Further, the program may be recorded in the memory 164 of the ECU 160 or on a recording medium connected from the outside. Alternatively, each of these units included in the processor 162 may be a dedicated arithmetic circuit provided in the processor 162.

The transmission unit 162a of the processor 162 performs a process for transmitting the positioning information acquired by the positioning information receiver 110 to the server 600 via the wireless terminal 130. The transmission unit 162a may transmit the numbers of the vehicles 100, 102, 104 along with the positioning information. The reception unit 162b of the processor 162 performs a process for receiving adjustment information transmitted from the server 600 via the wireless terminal 130. The display processing unit 162c of the processor 162 performs a process for displaying display information received from the server 600 on the display device 170. The sound processing unit 162d of the processor 162 performs a process in which sound information received from the server 600 is output as sound from the speaker 180.

Figure 10:
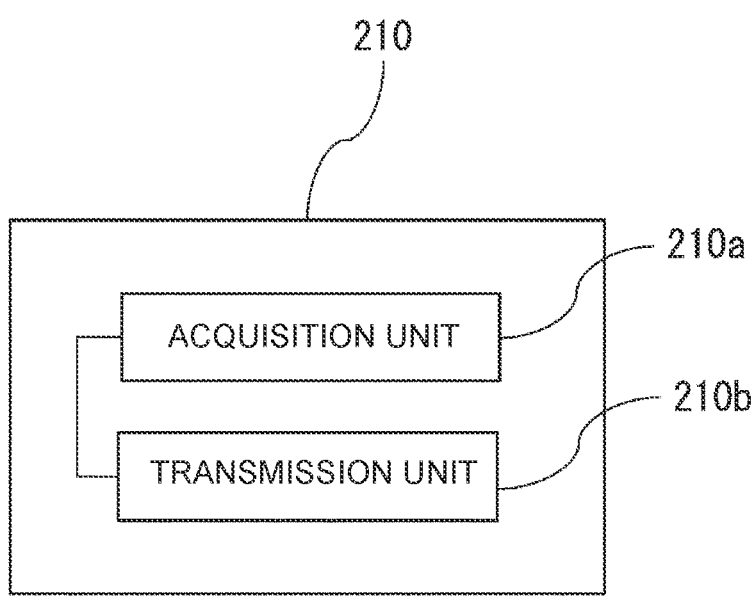
FIG. 10 is a schematic diagram showing a functional block of a control unit provided in the terminal.

FIG. 10 is a schematic diagram showing a functional block of the control unit 210 provided in the terminal 200. The control unit 210 of the terminal 200 includes an acquisition unit 210a and a transmission unit 210b. Each of these units included in the control unit 210 is, for example, a functional module realized by a computer program operating on the control unit 210. That is, each of these units included in the control unit 210 is composed of the control unit 210 and a program (software) for operating the control unit 210. Further, the program may be recorded in the storage unit 230 of the terminal 200 or a recording medium connected from the outside. Alternatively, each of these units included in the control unit 210 may be a dedicated arithmetic circuit provided in the control unit 210.

The acquisition unit 210a of the control unit 210 of the terminal 200 acquires various kinds of information input by operating the input unit 250. Information acquired by the acquisition unit 210a includes that the vehicle 100 parked in the parking lot 800 is scheduled to receive the package, the position information of the vehicle 100 in the parking lot 800 (the number of the parking slot where the vehicle 100 is parked), the number of the vehicle 100 parked in the parking lot 800, the position of the loading port for loading the package into the vehicle 100, delivery date and time, the size of the package, and the like.

The transmission unit 210b of the control unit 210 performs a process for transmitting information acquired by the acquisition unit 210a to the server 600 via the communication I/F 220. Since the information acquired by the acquisition unit 210a is the same as the delivery instruction transmitted from the terminal 200 to the delivery company server 300, the transmission unit 210b may transmit the delivery instruction transmitted to the delivery company server 300 to the server 600.

Figure 11:
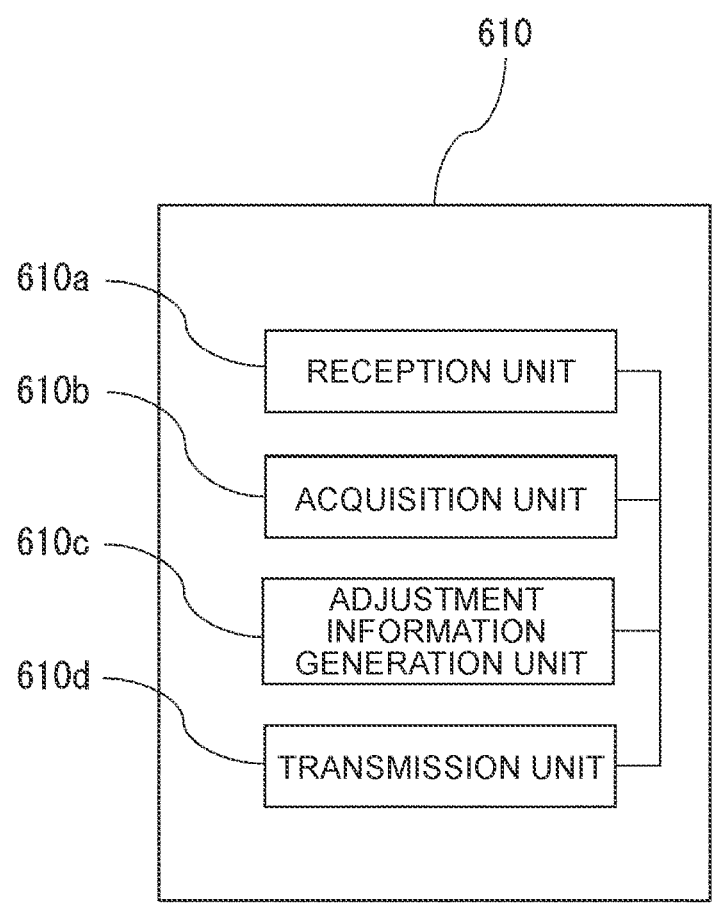
FIG. 11 is a schematic diagram showing a functional block of a control unit provided in the server.

FIG. 11 is a schematic diagram showing a functional block of the control unit 610 provided on the server 600. The control unit 610 of the server 600 includes a reception unit 610a, an acquisition unit 610b, an adjustment information generation unit 610c, and a transmission unit 610d. Each of these units included in the control unit 610 is, for example, a functional module realized by a computer program operating on the control unit 610. That is, each of these units included in the control unit 610 is composed of the control unit 610 and a program (software) for operating the control unit 610. Further, the program may be recorded in the storage unit 630 of the server 600 or a recording medium connected from the outside. Alternatively, each of these units included in the control unit 610 may be a dedicated arithmetic circuit provided in the control unit 610.

The reception unit 610a of the control unit 610 receives various kinds of information from the vehicles 100, 102, 104 or the terminal 200 via the communication I/F 620. The reception unit 610a receives information such as position information (positioning information) of the vehicle 100 and the number of the vehicle 100 from the vehicle 100. Further, the reception unit 610a receives information indicating that the vehicle 100 parked in the parking lot 800 is scheduled to receive the package, the position information of the vehicle 100 in the parking lot 800 (number of the parking slot), the number of the vehicle 100 parked in the parking lot 800, the position of the loading port for loading the package into the vehicle 100, delivery date and time, the size of the package, and the like, which have been transmitted from the terminal 200. Further, the reception unit 610a may receive information indicating the size of the vehicle (vehicle class) from each vehicle.

The acquisition unit 610b of the control unit 610 acquires the parking position of the vehicle 100 scheduled to receive the package in the parking lot 800. The acquisition unit 610b acquires the parking position of the vehicle 100 based on the position information of the vehicle 100 in the parking lot 800, the position information being received by the reception unit 610a from the terminal 200.

Meanwhile, the acquisition unit 610b may acquire the parking position of the vehicle 100 scheduled to receive the package based on the positioning information received from each vehicle by the reception unit 610a. In this case, the acquisition unit 610b collates the number of the vehicle 100 received from the terminal 200 by the reception unit 610a with the number received from each vehicle, and acquires the parking position of the vehicle 100 based on the positioning information of the vehicle that has transmitted the number that matches the number of the vehicle 100 received from the terminal 200.

Further, when the parking lot 800 is equipped with a camera that captures images of parked vehicles, the acquisition unit 610b may extract the vehicle 100 from among the images captured by the camera based on the number of the vehicle 100 received from the terminal 200 by the reception unit 610a, and acquire the parking position of the vehicle 100 based on the position of the vehicle 100 in the image and camera parameters (camera installation position, focal length, direction of the optical axis, etc.).

The adjustment information generation unit 610c of the control unit 610 generates adjustment information for adjusting parking of another vehicle in the parking slot adjacent to the parking position of the vehicle 100 scheduled to receive the package in the parking lot such that a space is secured around the vehicle 100 scheduled to receive the package.

The adjustment information generation unit 610c may generate the adjustment information for adjusting the parking of the other vehicle in the parking slot adjacent to the loading port such that a space is secured around the loading port, based on the parking position of the vehicle 100 scheduled to receive the package and the position of the loading port for the package in the vehicle 100.

Further, the adjustment information generation unit 610c may generate the adjustment information such that a priority of the parking slot adjacent to the loading port of the vehicle 100 scheduled to receive the package is lower than those of other parking slots. Thus, when other parking slots other than the parking slot adjacent to the loading port of the vehicle 100 are empty, the parking positions of the other vehicles 102, 104 are adjusted to be these empty parking slots. Further, when a parking slot is assigned to a vehicle entering the parking lot 800 in order, the order in which the parking slot adjacent to the loading port of vehicle 100 is assigned to the vehicle to be parked is later than the order in which another parking slot is assigned to the vehicle to be parked.

Specifically, the adjustment information generation unit 610c generates the adjustment information in which when the other parking slots other than the parking slot adjacent to the loading port are empty, the parking slots other than the parking slot adjacent to the loading port are set as parking positions of the other vehicles 102, 104. In this case, the adjustment information generation unit 610c may determine whether the other parking slots other than the parking slot adjacent to the loading port are empty based on the images generated by the camera that captures the images of the vehicles parked in the parking lot 800 and the floor plan of the parking lot 800, and generate the adjustment information based on this.

Further, when the other parking slots other than the parking slot adjacent to the loading port are not empty, the adjustment information generation unit 610c may set the parking slot adjacent to the loading port as the parking positions of the other vehicle 102, 104, and generate adjustment information in which the other vehicles 102, 104 are separated from the loading port. In this case, the adjustment information may be adjustment information in which a distance to be separated (for example, one m or more) is specifically specified.

Further, when the other parking slots other than the parking slot adjacent to the loading port are not empty, the parking of each of the other vehicles 102, 104 in the parking slot adjacent to the loading port may be adjusted based on the size of each of the other vehicles 102, 104 (vehicle class) received by each of the other vehicles 102, 104 and the size of the parking slot 810. Specifically, the adjustment information generation unit 610c may generate the adjustment information in which the parking slot adjacent to the loading port is set as the parking position of each of the other vehicles 102, 104, and each of the other vehicles 102, 104 is separated from the loading port when the size of each of the other vehicles 102, 104 with respect to the size of the parking slot 810 is small by a threshold value or more, and may generate the adjustment information in which the parking slot adjacent to the loading port is not set as the parking position of each of the other vehicles 102, 104 (that is, the parking of each of the other vehicles 102, 104 is not allowed) when the size of each of the other vehicles 102, 104 with respect to the parking slot 810 is not small by the threshold value or more.

Further, a space required for loading the package may be different depending on whether the delivery person delivers the package or the delivery robot delivers the package, and a space required for loading the package may be larger when the delivery robot delivers the package than when the delivery person delivers the package. For this reason, in a case where other parking slots other than the parking slot adjacent to the loading port are not empty, the adjustment information generation unit 610c may generate the adjustment information in which the other vehicles 102, 104 are further separated from the loading port when the delivery robot delivers the package than when the delivery person delivers the package.

In the first embodiment, the adjustment information is display information for adjusting the parking positions of the other vehicles 102, 104. Further, the adjustment information is sound information for adjusting the parking positions of the other vehicles 102, 104.

The transmission unit 610d of the control unit 610 transmits the display information to the other vehicles 102, 104 so as to display the display information on the display device 170 provided in the other vehicles. Further, the transmission unit 610d transmits the sound information to the other vehicles 102, 104 so as to output the sound information as sound from a sound output device (speaker 180) provided in the other vehicles.

Figure 12:
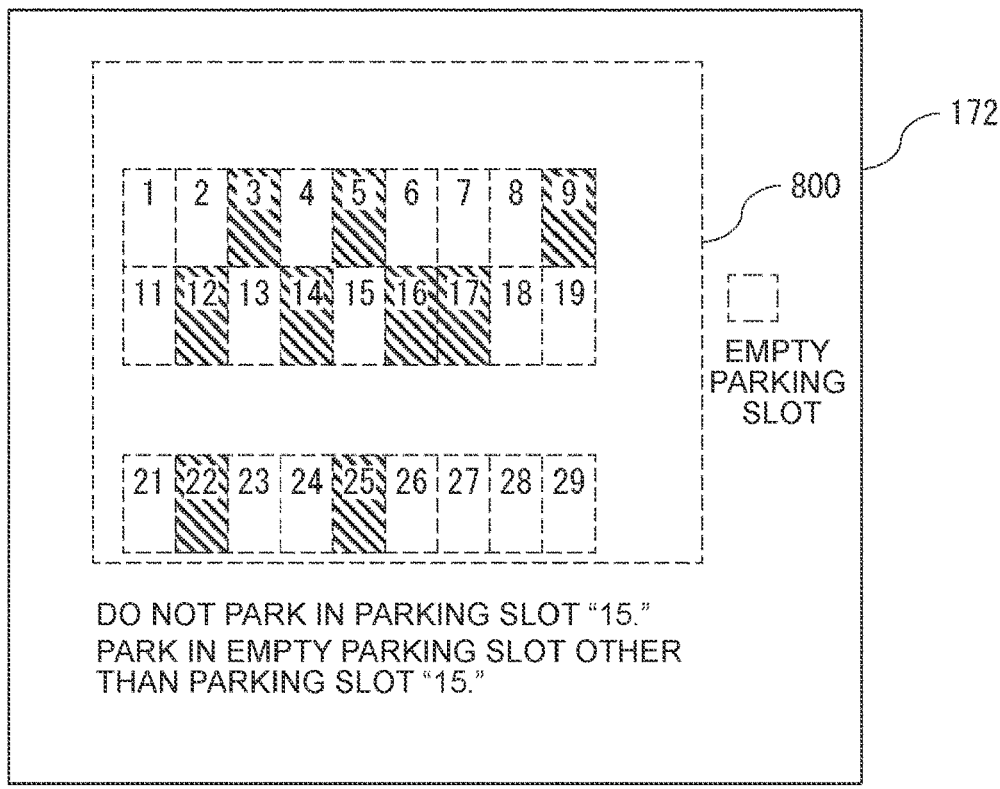
FIG. 12 is a schematic diagram showing an example of a display screen of a display device of another vehicle.
Figure 13:
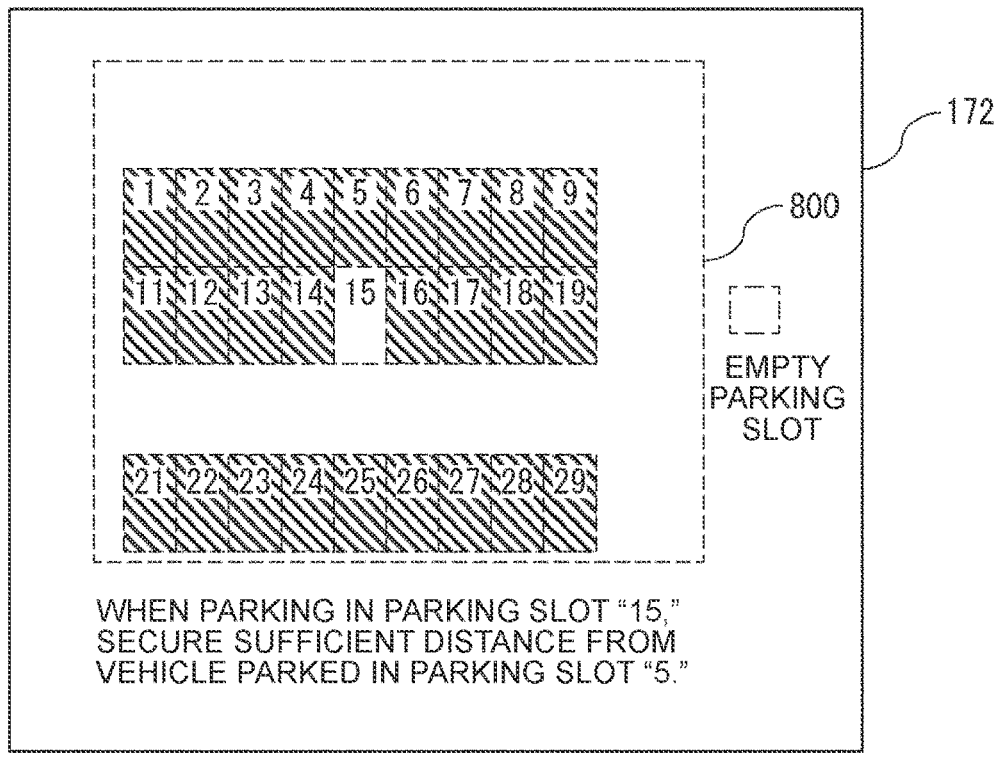
FIG. 13 is a schematic diagram showing an example of a display screen of a display device of another vehicle.

FIGS. 12 and 13 are each a schematic diagram showing an example of a display screen 172 of the display device 170 of each of the other vehicles 102, 104, and a diagram showing a state in which the display information transmitted to each of the other vehicles 102, 104 is displayed on the display device 170 by the display processing unit 162*c* of the processor 162 of the ECU 160 of each of the other vehicles 102, 104. The parking position of each vehicle in the example shown in FIG. 12 corresponds to that in the example shown in FIG. 5. The example shown in FIG. 12 shows a case in which the vehicle 100 scheduled to receive the package is parked in the parking slot "5," and the parking slot "15" adjacent to the trunk 100*a* that is the loading port of the vehicle 100 for the package is empty. A plan view of the parking lot 800 is shown on the display screen 172, and parking slots without hatching indicate empty parking slots. In this case, as shown in FIG. 12, display of "Do not park in the parking slot "15." Park in an empty parking slot other than the parking slot "15." is displayed on the display screen 172. Thus, a driver of each of the other vehicles 102, 104 parks each of the other vehicles 102, 104 in an empty parking slot other than the parking slot "15," so that when the package is loaded into the trunk 100*a* of the vehicle 100, a space required for loading the package is secured.

Further, the example shown in FIG. 13 shows a case in which the vehicle 100 scheduled to receive the package is parked in the parking slot "5," the parking slot "15" adjacent to the trunk 100*a* that is the loading port for the package into the vehicle 100 is empty, and all the other parking slots other than the parking slot "15" are not empty. In this case, as shown in FIG. 13, display of "When parking in the parking slot "15," secure a sufficient distance from the vehicle parked in the parking slot "5."" is displayed on the display screen 172. Thus, the driver of each of the other vehicles 102, 104 secures a sufficient distance from the trunk 100*a* of the vehicle 100 when each of the other vehicles 102, 104 is parked in the parking slot "15," so that when the package is loaded into the trunk 100*a* of the vehicle 100, a space required for loading the package is secured.

FIGS. 12 and 13 each show a case where the loading port of the vehicle 100 for the package is the trunk 100*a* at the rear side of the vehicle. In FIG. 12, when the loading port of the vehicle 100 for the package is the door on the right side of the vehicle, display of "Do not park in the parking slot "6." Park in an empty parking slot other than the parking slot "6."" is displayed on the display screen 172. Further, in FIG. 13, when the loading port of the vehicle 100 for the package is the door on the right side of the vehicle, the parking slot "6" adjacent to the right side of the vehicle 100 is empty, and all the other parking slots other than the parking slot "6" are not empty, display of "When parking in the parking slot "6," secure a sufficient distance from the vehicle parked in the parking slot "5."" is displayed on the display screen 172.

In the example shown in FIG. 12, the reception unit 162*b* of the processor 162 receives, from the server 600, sound information indicating sound of "Do not park in the parking slot "15." Park in an empty parking slot other than the parking slot "15." The sound processing unit 162*d* of the processor 162 outputs this sound information as sound from the speaker 180. Similarly, in the example shown in FIG. 13, the reception unit 162*b* of the processor 162 receives, from the server 600, sound information indicating sound of "When parking in the parking slot "15," secure a sufficient distance from the vehicle parked in the parking slot "5."" The sound processing unit 162*d* of the processor 162 outputs this sound information as sound from the speaker 180.

Figure 14:
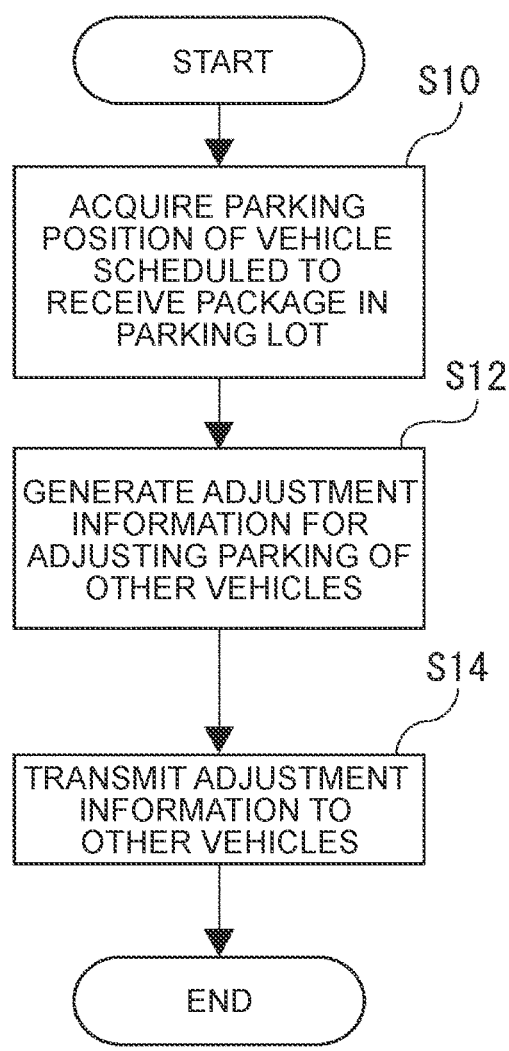
FIG. 14 is a flowchart showing a process performed by the server.

FIG. 14 is a flowchart showing a process performed by the server 600. The process shown in FIG. 14 is performed in the control unit 610 of the server 600 for every predetermined control cycle.

First, the acquisition unit 610*b* of the control unit 610 of the server 600 acquires the parking position of the vehicle 100 scheduled to receive the package in the parking lot 800 (step S10). Next, the adjustment information generation unit 610*c* of the control unit 610 generates the adjustment information for adjusting parking of the other vehicles 102, 104 in the parking slot adjacent to the parking position acquired in step S10 such that a space is secured around the vehicle 100 scheduled to receive the package (step S12). Next, the transmission unit 610*d* of the control unit 610 transmits the adjustment information to the other vehicles 102, 104 (step S14). In the first embodiment, the display information and the sound information are generated in step S12, and the display information and the sound information are transmitted to the other vehicles 102, 104 in step S14.

2. Second Embodiment

Figure 15:
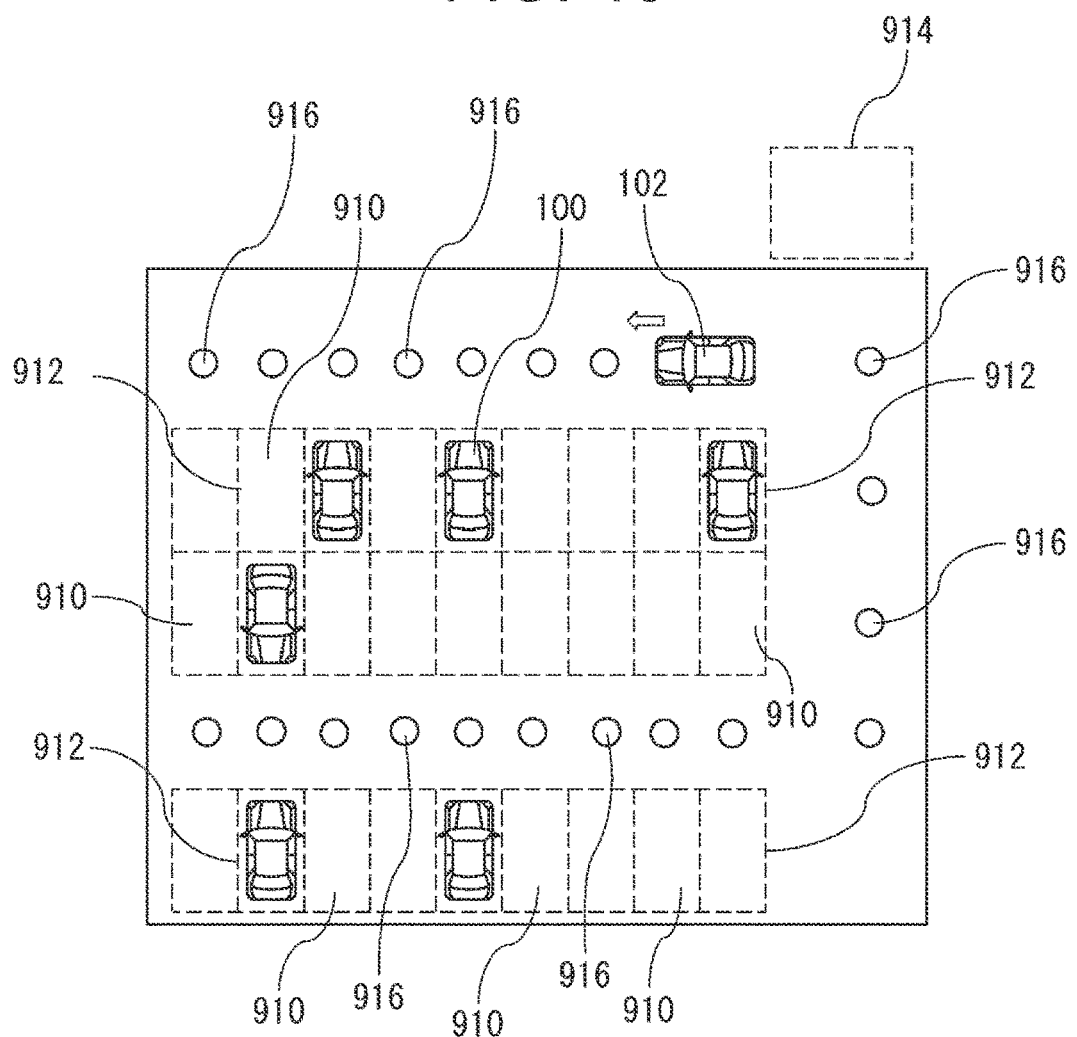
FIG. 15 is a plan view showing a parking lot where a parking position of a vehicle is adjusted by a parking management system according to a second embodiment.

FIG. 15 is a plan view showing a parking lot 900 where a parking position of a vehicle is adjusted by the parking management system 2000 according to a second embodiment. In the second embodiment, the vehicles 100, 102, 104 are autonomous driving vehicles capable of autonomous driving, and the vehicles 100, 102, 104 drive autonomously within the parking lot 900. The parking management system 2000 in the second embodiment includes a system for managing automated valet parking (AVP).

The parking lot 900 includes a plurality of parking slots 910 where the vehicles 100, 102, 104 are parked, marking lines 912, a boarding and alighting space 914, and marks 916 for position detection. The boarding and alighting space 914 is a space for occupants of the vehicles 100, 102, 104 to get on and off the vehicles. When the vehicles 100, 102, 104 enter the parking lot 900, the occupants get off the vehicles 100, 102, 104 in the boarding and alighting space 914. Further, when the vehicles 100, 102, 104 leave the parking lot 900, and the vehicles 100, 102, 104 arrive at the boarding and alighting space 914 from parking slots 910, the occupants get on the vehicles 100, 102, 104 at the boarding and alighting space 914. The server 600 manages entry actions of the vehicles 100, 102, 104 from the boarding and alighting space 914 to the parking slots 910 where the vehicles are scheduled to be parked, and leaving actions of the vehicles 100, 102, 104 from the parking slots 910 to the boarding and alighting space 914. Management of the entry and leaving actions by the server 600 includes management of autonomous travel of the vehicles 100, 102, 104. A process for the autonomous travel is basically performed on the ECU 160 mounted on each of the vehicles 100, 102, 104. However, the server 600 may remotely operate the vehicles 100, 102, 104. In this case, the process for the autonomous travel may be performed in the server 600.

Further, in the parking lot 800, the occupants may get on the vehicles 100, 102, 104. That is, the parking management system 2000 according to the second embodiment is not only a system that manages the automated valet parking, but also includes that the vehicles 100, 102, 104 drive autonomously in the parking lot 800 while the occupants are in the vehicle.

The mark 916 for position detection is provided on a road surface or at a predetermined height position from the road surface, and is a position reference used by the vehicles 100, 102, 104 to detect the positions of the own vehicles. The mark 916 has different identification information depending on the installation position in the parking lot 900. In the floor plan of the parking lot 900 included in control information transmitted from the server 600 to the vehicle, which will be described below, the identification information is associated with the position of each mark 916. As the identification information, barcodes, numbers, etc. are used, for example. Accordingly, the vehicles 100, 102, 104 can acquire the positions and the postures of the own vehicles in the parking lot 900 based on the identification information identified from the position and the image of the mark 916 in the image generated by the in-vehicle camera 105 capturing the image of the mark 916, camera parameters of the in-vehicle camera 105 (camera installation position, focal length, direction of the optical axis, etc.), and the floor plan of the parking lot 900.

In the second embodiment, the functional block of the control unit 610 provided in the server 600 is configured similarly to that in the first embodiment shown in FIG. 11. In the second embodiment, the adjustment information generated by the adjustment information generation unit 610c of the control unit 610 is the adjustment information described in the first embodiment, and is control information for controlling the parking positions of the other vehicles 102, 104.

The control information includes the position information on the parking slots where the other vehicles 102, 104 are parked, the floor plan of the parking lot 900, the parking positions of the other vehicles 102, 104 within the parking slots where the other vehicles 102, 104 are parked, and the like The transmission unit 610d of the control unit 610 transmits the control information to the other vehicles 102, 104 so as to control the parking positions of the other vehicles 102, 104 based on the control information.

Figure 16:
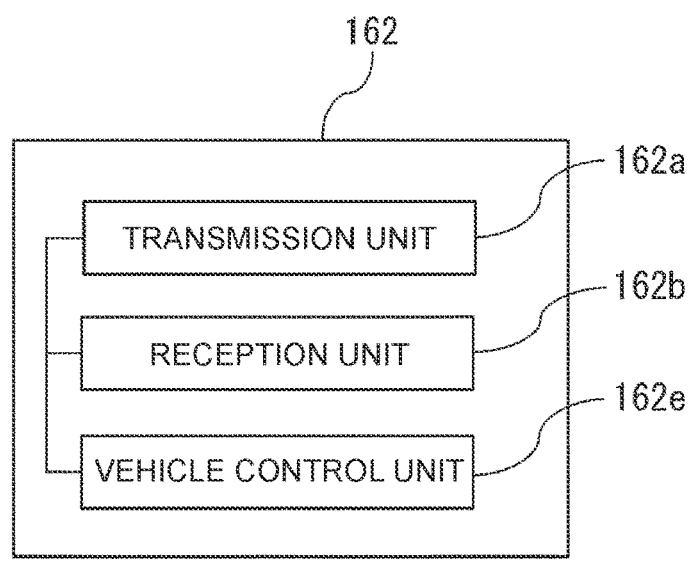
FIG. 16 is a schematic diagram showing a functional block of a processor of an ECU provided in each vehicle in the second embodiment.

FIG. 16 is a schematic diagram showing a functional block of the processor 162 of the ECU 160 provided in each of the vehicles 100, 102, 104 in the second embodiment. The processor 162 includes the transmission unit 162a, the reception unit 162b, and a vehicle control unit 162e.

The functions of the transmission unit 162a and the reception unit 162b are the same as those in the first embodiment. In the second embodiment, the reception unit 162b receives the control information for controlling the parking positions of the other vehicles 102, 104.

The vehicle control unit 162e controls, based on the control information received by the reception unit 162b, the vehicle control device 120 such that a space is secured around the vehicle 100 scheduled to receive the package (around the loading port), regarding parking of each of the other vehicles 102, 104 in the parking slot adjacent to the parking position of the vehicle 100 scheduled to receive the package in the parking lot, and causes each of the other vehicles 102, 104 to be parked in the parking slot instructed by the control information. At this time, the vehicle control unit 162e obtains, based on the positioning information acquired by the positioning information receiver 110 and the image generated by the in-vehicle camera 105 capturing the image of the mark 916, the positions and the postures of the own vehicles (other vehicles 102, 104) in the parking lot 900. Then, the vehicle control unit 162e controls the vehicle control device 120 based on the positions and the postures of the own vehicles in the parking lot 900, and causes each of the other vehicles 102, 104 to be parked in the parking slot instructed by the control information. Specifically, the vehicle control unit 162e causes each of the other vehicles 102, 104 to be parked in the parking slot instructed by the control information such that a priority of the parking slot adjacent to the loading port of the vehicle 100 scheduled to receive the package is lower than those of other parking slots. Further, when other parking slots other than the parking slot adjacent to the loading port of the vehicle 100 scheduled to receive the package are empty, the vehicle control unit 162e causes the own vehicles (other vehicles 102, 104) to be parked in the parking slots that are other than the parking slot adjacent to the loading port and that are instructed by the control information. Further, when the other parking slots other than the parking slot adjacent to the loading port are not empty, the vehicle control unit 162e sets the parking slot adjacent to the loading port as the parking position of each of the own vehicles (other vehicles 102, 104) to cause each of the other vehicles 102, 104 to be parked such that each of the other vehicles 102, 104 is separated from the loading port.

In the second embodiment, a process performed by the server 600 is the same as that in the first embodiment shown in FIG. 14. In the second embodiment, the control information is generated in step S12 of FIG. 14, and the control information is transmitted to the other vehicles 102, 104 in step S14 of FIG. 14.

In a case of the automated valet parking, since no occupants are in the vehicle during parking, more vehicles can be parked by bringing adjacent vehicles close to each other. In such a case, when another vehicle is parked close to the vehicle 100 scheduled to receive the package, it becomes more difficult to secure a space required for loading the package than when the package is loaded in a normal parking lot.

In the present embodiment, in a system that manages the automated valet parking, the control information for controlling the parking positions of the other vehicles 102, 104 is generated, and the parking positions of the other vehicles 102, 104 are controlled, so that the control information is transmitted to the other vehicles 102, 104. Then, the other vehicles 102, 104 control the vehicle control device 120 based on the control information, and cause the own vehicles to be parked in the parking slots instructed by the control information. Therefore, even in the automated valet parking where the adjacent vehicles are brought close to each other, the space required for loading the package can be secured.

3. Third Embodiment

In a third embodiment, the parking management system 2000 is composed of a system for managing the automated valet parking. The third embodiment differs from the second embodiment in that the parking robot is configured to transport the vehicles 100, 102, 104 to the parking positions.

Figure 17:
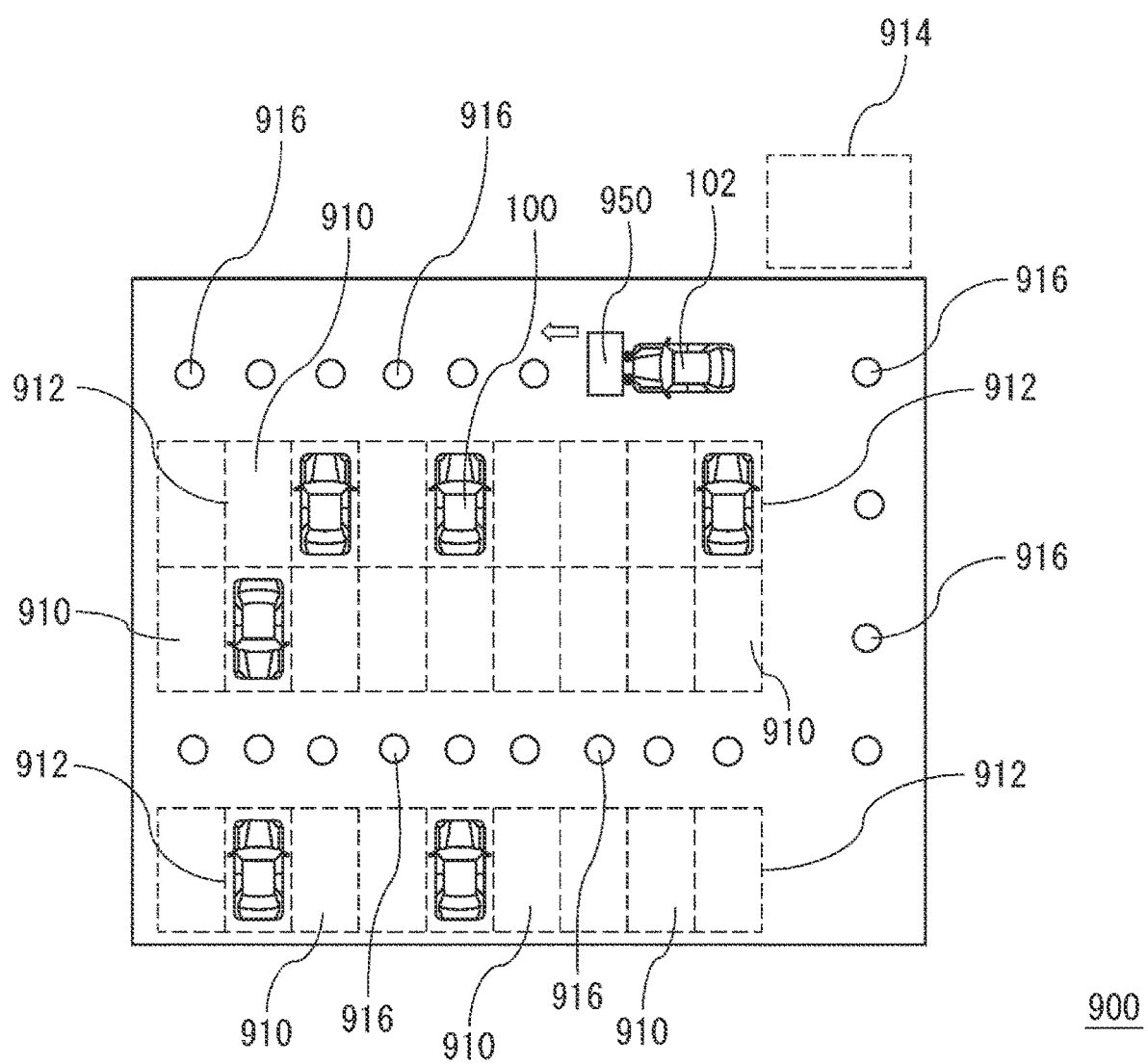
FIG. 17 is a plan view showing a parking lot where a parking position of a vehicle is adjusted by a parking management system according to a third embodiment.

FIG. 17 is a plan view showing the parking lot 900 where a parking position of a vehicle is adjusted by the parking management system 2000 according to the third embodiment. The parking lot 900 is configured similarly to that in the second embodiment. A parking robot 950 is a robot that is operated under control of the server 600, lifts the vehicles 100, 102, 104, and transports the vehicles 100, 102, 104 between the boarding and alighting space 914 and the parking slots where the vehicles 100, 102, 104 are parked.

Figure 18:
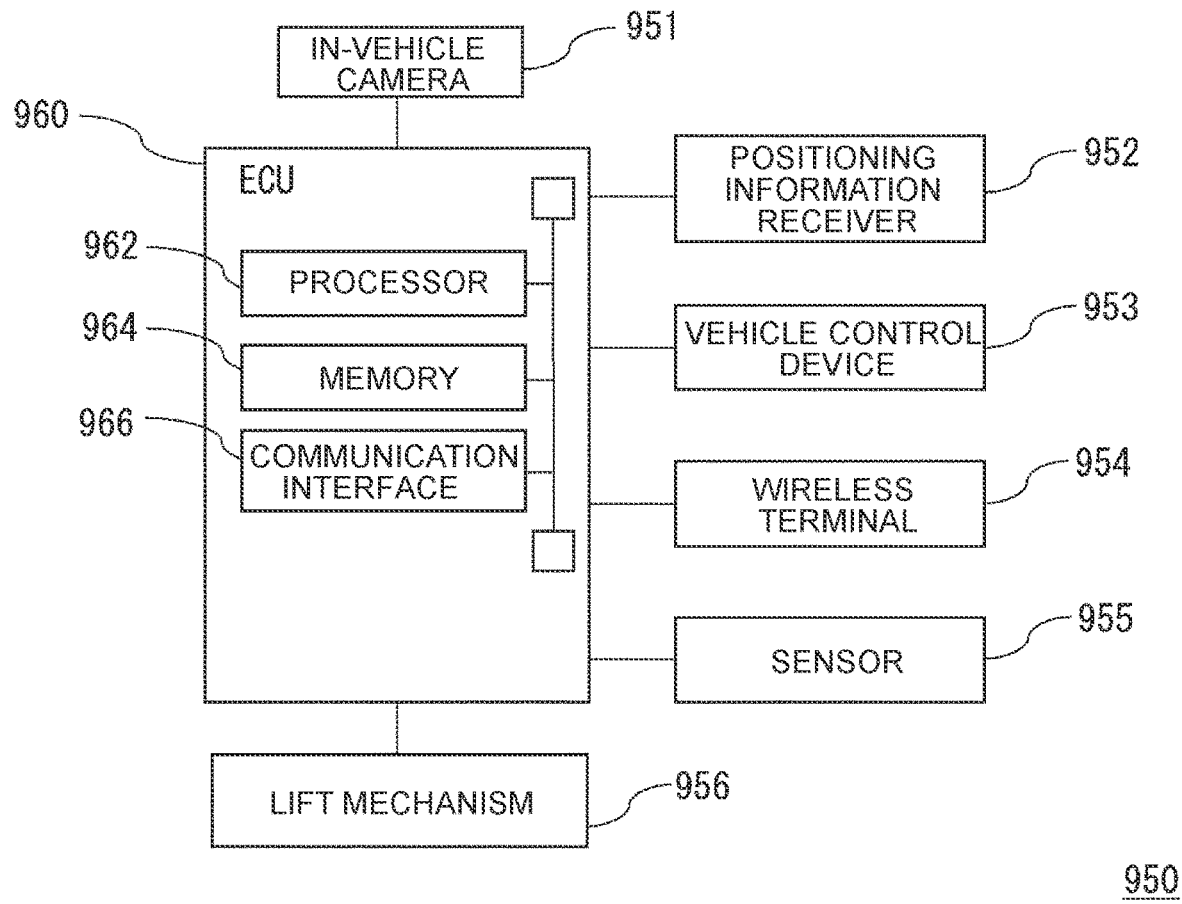
FIG. 18 is a block diagram showing a configuration of a parking robot.

FIG. 18 is a block diagram showing a configuration of the parking robot 950. The parking robot 950 includes an in-vehicle camera 951, a positioning information receiver 952, a vehicle control device 953, a wireless terminal 954, one or more sensors 955, a lift mechanism 956, and an electronic control unit (ECU: hereinafter referred to as the "ECU") 960.

In the third embodiment, the in-vehicle camera 951, the positioning information receiver 952, the vehicle control device 953, the wireless terminal 954, the one or more sensors 955, and the ECU 960 are configured similarly to the in-vehicle camera 105, the positioning information receiver 110, the vehicle control device 120, the wireless terminal 130, the one or more sensors 140, and the ECU 160 of each of the vehicles 100, 102, 104 described in the first embodiment.

The lift mechanism 956 uses a motor as a driving source, for example, and lifts the vehicles 100, 102, 104 when transporting the vehicles 100, 102, 104 between the boarding and alighting space 914 and the parking slots where the vehicles 100, 102, 104 are parked.

In the third embodiment, the functional block of the control unit 610 provided in the server 600 is configured similarly to that in the first embodiment shown in FIG. 11. Similarly to the second embodiment, the adjustment information generated by the adjustment information generation unit 610c of the control unit 610 is the control information for controlling the parking positions of the other vehicles 102, 104. The transmission unit 610d of the control unit 610 transmits the control information to the parking robot 950 so as to control the parking positions of the other vehicles 102, 104 based on the control information.

Figure 19:
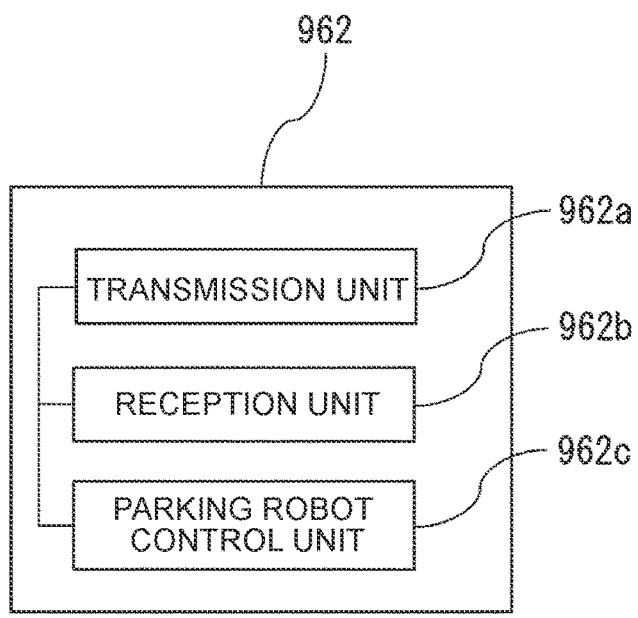
FIG. 19 is a schematic diagram showing a functional block of a processor of an ECU provided in the parking robot in the third embodiment.

FIG. 19 is a schematic diagram showing a functional block of a processor 962 of the ECU 960 provided in the parking robot 950 in the third embodiment. The processor 962 includes a transmission unit 962a, a reception unit 962b, and a parking robot control unit 962c.

The functions of the transmission unit 962a and the reception unit 962b are similar to the transmission unit 162a and the reception unit 162b of the processor 162 of the ECU 160 in the second embodiment, and the reception unit 962b receives the control information for controlling the parking positions of the other vehicles 102, 104.

The parking robot control unit 962c controls, based on the control information received by the reception unit 962b, the vehicle control device 953 and the lift mechanism 956 such that a space is secured around the vehicle 100 scheduled to receive the package (around the loading port), regarding parking of each of the other vehicles 102, 104 in the parking slot adjacent to the parking position of the vehicle 100 scheduled to receive the package in the parking lot, and causes each of the other vehicles 102, 104 to be parked in the parking slot instructed by the control information. Similarly to the vehicle control unit 162e in the second embodiment, the parking robot control unit 962c obtains the position and the posture of the parking robot 950 in the parking lot 900 based on the positioning information acquired by the positioning information receiver 952 and the image generated by the in-vehicle camera 951 capturing the image of the mark 916. Then, the parking robot control unit 962c controls the vehicle control device 953 and the lift mechanism 956 based on the position and the posture of the parking robot 950 in the parking lot 900, and the control information, and causes each of the other vehicles 102, 104 to be parked in the parking slot instructed by the control information. Specifically, the parking robot control unit 962c causes each of the other vehicles 102, 104 to be parked in the parking slot instructed by the control information such that a priority of the parking slot adjacent to the loading port of the vehicle 100 scheduled to receive the package is lower than those of other parking slots. Further, when other parking slots other than the parking slot adjacent to the loading port of the vehicle 100 scheduled to receive the package are empty, the parking robot control unit 962c causes the other vehicles 102, 104 to be parked in the parking slots that are other than the parking slot adjacent to the loading port and that are instructed by the control information. Further, when the other parking slots other than the parking slot adjacent to the loading port are not empty, the parking robot control unit 962c sets the parking slot adjacent to the loading port as the parking position of each of the other vehicles 102, 104 to cause each of the other vehicles 102, 104 to be parked such that each of the other vehicles 102, 104 is separated from the loading port.

In the third embodiment as well, a process performed by the server 600 is the same as that in the first embodiment shown in FIG. 14. In the third embodiment, similarly to the second embodiment, the control information is generated in step S12 of FIG. 14. In the third embodiment, unlike step S14 in FIG. 14, the control information is transmitted to the parking robot 950.

What is claimed is:

1. A parking position adjustment device for adjusting a parking position of a vehicle in a parking lot, the parking position adjustment device comprising:
a processor, wherein
the processor is configured to:
acquire the parking position of the vehicle scheduled to receive a package in the parking lot;
generate adjustment information for adjusting parking of another vehicle in a parking slot adjacent to the parking position such that a space is secured around the vehicle scheduled to receive the package, and
generate, based on the parking position of the vehicle scheduled to receive the package and a position of a loading port of the vehicle for the package, the adjustment information for adjusting parking of the other vehicle in a parking slot adjacent to the loading port such that a space is secured around the loading port,
wherein:
the adjustment information is control information for controlling a parking position of the other vehicle;
the other vehicle is an autonomous driving vehicle that is able to drive autonomously; and
the processor is configured to transmit the control information to the other vehicle, and to control the parking position of the other vehicle based on the adjustment information.

2. The parking position adjustment device according to claim 1, wherein the processor is configured to generate the adjustment information such that a priority of the parking slot adjacent to the loading port of the vehicle scheduled to receive the package is lower than priorities of other parking slots.

3. The parking position adjustment device according to claim 2, wherein when another parking slot other than the parking slot adjacent to the loading port is empty, the processor is configured to generate the adjustment information in which the other parking slot other than the parking slot adjacent to the loading port is set as a parking position of the other vehicle.

4. The parking position adjustment device according to claim 2, wherein when another parking slot other than the parking slot adjacent to the loading port is not empty, the processor is configured to generate the adjustment information in which the parking slot adjacent to the loading port is set as a parking position of the other vehicle and the other vehicle is separated from the loading port.

5. The parking position adjustment device according to claim 1, wherein:

the adjustment information is display information for adjusting a parking position of the other vehicle; and the processor is configured to transmit the display information to the other vehicle so as to display the display information on a display device provided in the other vehicle.

6. The parking position adjustment device according to claim 1, wherein:

the adjustment information is sound information for adjusting a parking position of the other vehicle; and the processor is configured to transmit the sound information to the other vehicle so as to output the sound information as sound from a sound output device provided in the other vehicle.

7. The parking position adjustment device according to claim 1, wherein:

the adjustment information is control information for controlling a parking position of the other vehicle;

the other vehicle is transported to the parking position by a parking robot; and the processor is configured to transmit the control information to the parking robot so as to control the parking position of the other vehicle based on the control information.

8. A parking position adjustment method for adjusting a parking position of a vehicle in a parking lot, the parking position adjustment method comprising:

a step of acquiring the parking position of the vehicle scheduled to receive a package in the parking lot; and a step of generating adjustment information for adjusting parking of another vehicle in a parking slot adjacent to the parking position such that a space is secured around the vehicle scheduled to receive the package, wherein in the step of generating the adjustment information, based on the parking position of the vehicle scheduled to receive the package and a position of a loading port of the vehicle for the package, the adjustment information for adjusting parking of the other vehicle in a parking slot adjacent to the loading port such that a space is secured around the loading port is generated, wherein:

the adjustment information is control information for controlling a parking position of the other vehicle;

the other vehicle is an autonomous driving vehicle that is able to drive autonomously; and the parking position adjustment method includes a step of transmitting the control information to the other vehicle and a step of controlling the parking position of the other vehicle based on the adjustment information.

9. The parking position adjustment method according to claim 8, wherein in the step of generating the adjustment information, the adjustment information is generated such that a priority of the parking slot adjacent to the loading port of the vehicle scheduled to receive the package is lower than priorities of other parking slots.

10. The parking position adjustment method according to claim 9, wherein in the step of generating the adjustment information, when another parking slot other than the parking slot adjacent to the loading port is empty, the adjustment information in which the other parking slot other than the parking slot adjacent to the loading port is set as a parking position of the other vehicle is generated.

11. The parking position adjustment method according to claim 9, wherein in the step of generating the adjustment information, when another parking slot other than the parking slot adjacent to the loading port is not empty, the adjustment information in which the parking slot adjacent to the loading port is set as a parking position of the other vehicle and the other vehicle is separated from the loading port is generated.

12. The parking position adjustment method according to claim 8, wherein:

the adjustment information is display information for adjusting a parking position of the other vehicle; and the parking position adjustment method includes a step of transmitting the display information to the other vehicle so as to display the display information on a display device provided in the other vehicle.

13. The parking position adjustment method according to claim 8, wherein:

the adjustment information is sound information for adjusting a parking position of the other vehicle; and the parking position adjustment method includes a step pf transmitting the sound information to the other vehicle so as to output the sound information as sound from a sound output device provided in the other vehicle.

14. A parking position adjustment method for adjusting a parking position of a vehicle in a parking lot, the parking position adjustment method comprising:

a step of acquiring the parking position of the vehicle scheduled to receive a package in the parking lot; and a step of generating adjustment information for adjusting parking of another vehicle in a parking slot adjacent to the parking position such that a space is secured around the vehicle scheduled to receive the package, wherein in the step of generating the adjustment information, based on the parking position of the vehicle scheduled to receive the package and a position of a loading port of the vehicle for the package, the adjustment information for adjusting parking of the other vehicle in a parking slot adjacent to the loading port such that a space is secured around the loading port is generated, wherein:

the adjustment information is control information for controlling a parking position of the other vehicle;

the other vehicle is transported to the parking position by a parking robot; and the parking position adjustment method includes a step of transmitting the control information to the parking robot and a step of controlling so the parking position of the other vehicle based on the adjustment information.

* * * * *